US006748030B2

(12) United States Patent
Myers

(10) Patent No.: US 6,748,030 B2
(45) Date of Patent: Jun. 8, 2004

(54) DIFFERENTIAL PHASE DEMODULATOR INCORPORATING 4$^{TH}$ ORDER COHERENT PHASE TRACKING

(75) Inventor: Michael H. Myers, Poway, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 735 days.

(21) Appl. No.: 09/732,431

(22) Filed: Dec. 7, 2000

(65) Prior Publication Data
US 2002/0071503 A1 Jun. 13, 2002

(51) Int. Cl.$^7$ ................................................. H03O 3/22

(52) U.S. Cl. ........................................ 375/330; 375/283

(58) Field of Search ................................. 375/330, 331, 375/332, 344, 279, 280, 283; 455/431; 342/99; 367/904

(56) References Cited

U.S. PATENT DOCUMENTS 5,872,801 A * 2/1999 Mobin ................................ 1/1
6,473,453 B1 * 10/2002 Wilkinson ................... 375/143
6,603,819 B1 * 8/2003 Myers ......................... 375/316

OTHER PUBLICATIONS

S.Y. Mui, "DPSK demodulation with Doppler compensation," 1996, IEEE, pp. 1074–1078.*
Biglieri et al, "Modulation and coding for mobile radio communications:Channels with correlated Rice fading and Doppler frequency shift," IEEE Transactions on Vehicular Technology, vol. 47, No. 1, 1998, pp. 133–141.*

* cited by examiner

Primary Examiner—Stephen Chin
Assistant Examiner—Kevin Kim
(74) Attorney, Agent, or Firm—John A. Miller; Warn, Burgess & Hoffmann, P.C.

(57) ABSTRACT

Demodulating a DPSK encoded data signal. The received signal has a symbol tracking value determined in a synchronization circuit. Doppler error in the signal is estimated. The signal, the symbol tracking value, and the estimated Doppler error are applied to a demodulator within which the signal is multiplied by a signal at a frequency which is the negative of the estimated Doppler error to remove that Doppler error. The resulting signal is filtered and decimated and normalized to generate the arctangent of the in-phase and quadrature components of the baseband signal. This arctangent signal is stripped of phase angle modulation and applied through loops to remove derivatives of the input phase signal. The arctangent and the resulting angles are mapped in a nearest neighbor map circuit, and the difference between successive angles is applied to a gray code to binary mapping circuit which detects the encoded data.

17 Claims, 4 Drawing Sheets

DIFFERENTIAL PHASE DEMODULATOR INCORPORATING 4$^{TH}$ ORDER COHERENT PHASE TRACKING

FIELD OF THE INVENTION

The present invention pertains to a differential demodulator for VHF radio signals. More particularly, the present invention pertains to a demodulator for performing differential phase shift keying demodulation, for example differential 8 phase shift keying (D8PSK) demodulation.

BACKGROUND OF THE INVENTION

VHF data radio is frequently used for communication with commercial airliners, to provide navigational and other critical information to the airliners from a ground based location. Movement of the airliner relative to the ground and thermal drift in the transmit and receive oscillators result in a Doppler error in the frequency of the received signal, as well as a Doppler derivative error. Because of the low losses required in demodulation, and because of the possible Doppler derivatives, pure differential demodulation does not meet system performance requirements. As a consequence, there is a need for an improved demodulation technique which can track the Doppler error and its derivatives, while also avoiding the problem of differential phase noise.

SUMMARY OF THE INVENTION

The present invention is a method of demodulating a received radio frequency signal, including a baseband signal with differential phase shift keying encoded data, to obtain the encoded data. The present invention is applicable to modulation of any reasonable phase order. Thus, although in the following the invention is described with reference to D8PSK demodulation, it is application generally to any D*PSK demodulation, where * represents any integer.

In accordance with the present invention, the radio frequency signal is received and detected, the symbol phase of the encoded data is established, and any Doppler error in the received signal is reduced. The envelope of the phase-tracked baseband signal is normalized, and the phase of the D8PSK encoded data within the signal is tracked to obtain raw output symbols. The raw output symbols are mapped in a nearest neighbor map into one of 8 possible values, and the differential phase angle between successive, i.e. time-adjacent, mapped symbols is computed and then converted into a binary format, providing the encoded data.

In accordance with a preferred embodiment of the present invention, the Doppler error in the received signal is reduced by estimating the Doppler error and multiplying the detected signal by the negative of the estimated Doppler frequency, i.e. a signal offset from the baseband frequency in the direction opposite to, and in an amount equal to, the estimated Doppler frequency. Preferably, the estimated Doppler frequency is determined by correlating a portion of the received signal, such as the start of message signal, in a plurality of filters matched to different frequencies, and using the frequency of the correlator filter with the largest output magnitude as the estimated Doppler frequency.

Likewise, in a preferred embodiment of the present invention, the envelope of the filtered and decimated baseband signal is normalized by converting in-phase and quadrature components of the envelope into angular representations, and converting the angular representations into normalized in-phase and quadrature components. In a preferred embodiment of the present invention, the phase of the D8PSK encoded data is tracked in a fourth order phase lock loop. In a particularly preferred embodiment, the fourth order phase lock loop is made up of two second order phase lock loops in tandem, with the bandwidth of the first loop being wide enough to prevent phase unlock. Preferably, the D8PSK encoded phase symbols are tracked by multiplying the angular representations by 8 so as to strip off the 8 phase modulation, converting the stripped angular representations into stripped in-phase and quadrature components, applying the stripped in-phase and quadrature components to the fourth order phase lock loop, and multiplying the phase lock loop output by the normalized in-phase and quadrature components.

BRIEF DESCRIPTION OF THE DRAWINGS

These and other aspects and advantages of the present invention are more apparent from the following detailed description and claims, particular when considered in conjunction with the accompanying drawings. In the drawings:

DETAILED DESCRIPTION OF A PREFERRED EMBODIMENT

Figure 2:
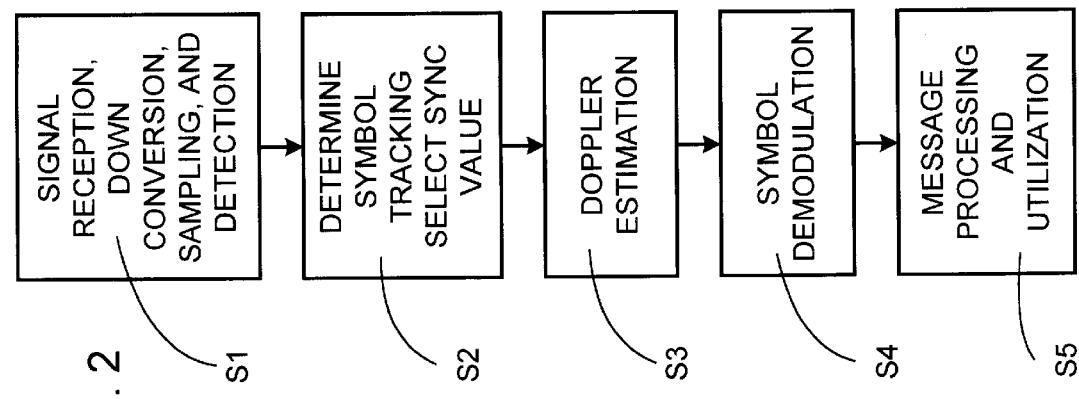
FIG. 2 is a flow chart of a method of demodulating a received radio frequency signal, including a baseband signal with D*PSK encoded data, to obtain the encoded data, in accordance with a preferred embodiment of the present invention.
Figure 1:
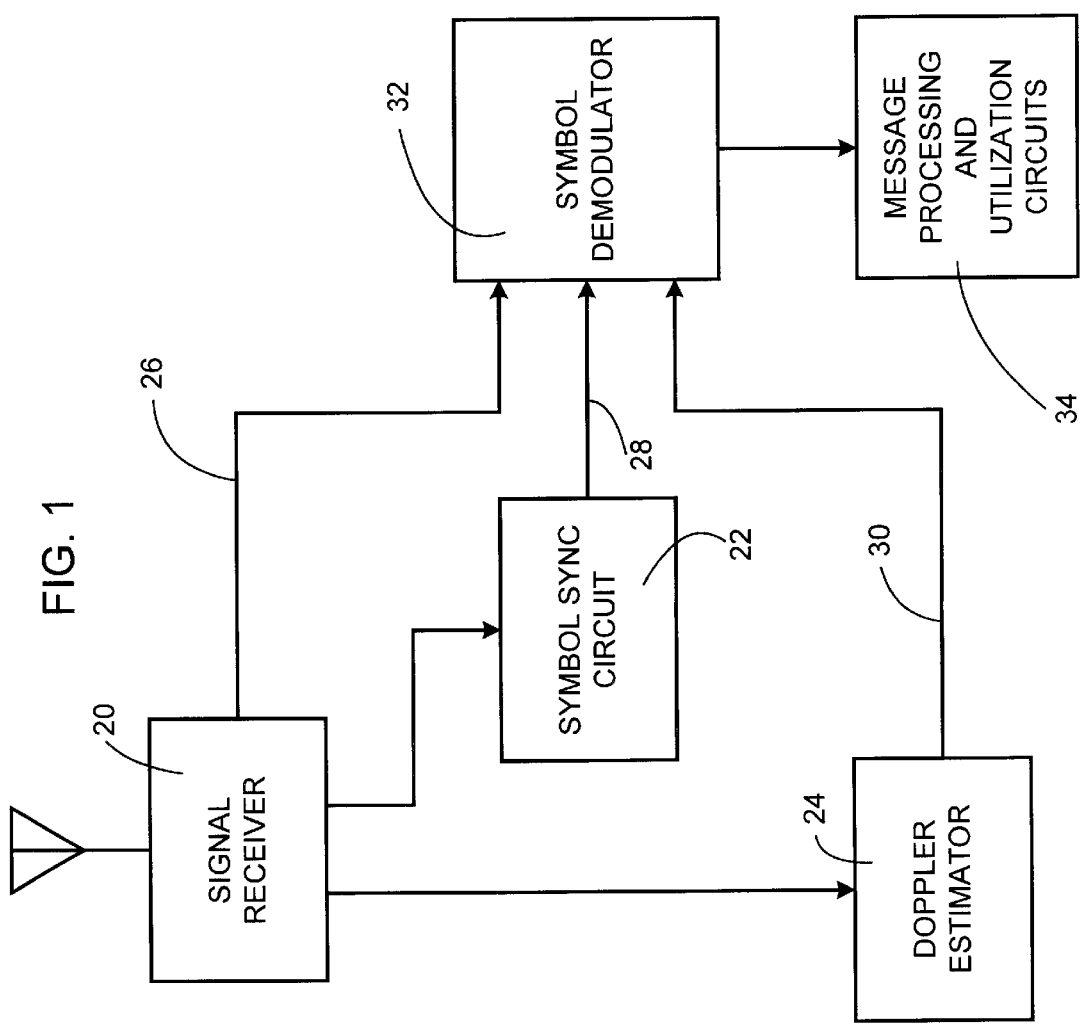
FIG. 1 is a block diagram of a VHF data radio system capable of demodulating a received radio frequency signal in accordance with a preferred embodiment of the present invention.

FIG. 1 is a block diagram of a VHF data radio system capable of demodulating a received radio frequency signal, including a baseband signal with D*PSK encoded data, to obtain the encoded data, in accordance with a preferred embodiment of the present invention, and FIG. 2 is a flow chart of the operation of the circuit of FIG. 1. In signal receiver 20, the VHF signal, including digitally encoded complex data is received, downconverted and sampled, for example at a sampling rate of 105 kilosamples per second (KSPS), and the digitally encoded complex data is detected (step S1). Symbol synchronization circuit 22 determines a symbol tracking select value (step S2), for example by decimating the received data stream at 105 ksps into 10 streams sampled at 10.5 ksps, each offset one sample from the previous stream. The stream with the minimum envelope variance envelope determines the symbol tracking select value. The symbol tracking select value determined in step S2 is used to decimate the input by 10 for input to Doppler estimation correlators, thus reducing the correlator size by a factor of 10. The received signal will have experienced a Doppler frequency shift from its original frequency, for example due to aircraft motion relative to the ground. Consequently, the received baseband signal will be at frequency $f_{dop}$, rather than at its original frequency of 0 Hz. Doppler estimator 24 provides an estimate $f_d$ of the Doppler frequency $f_{dop}$ (step S3). Doppler estimator 24 might determine the estimated frequency $f_d$ by passing the start of decimated message signal through a bank of correlators, each matched to a different frequency and known preamble, and determining the correlator with the largest output.

The received signal from signal receiver 20, the symbol tracking select value from symbol synchronization circuit 22, and the estimated Doppler frequency from Doppler estimator 24, are applied by lines 26, 28, and 30, respectively, to symbol demodulator 32 which performs symbol demodulation in accordance with the present invention (step S4). The resulting encoded data are then decoded, and the resulting message processed as appropriate in message processing and utilization circuits 34 (step S5).

Figure 3:
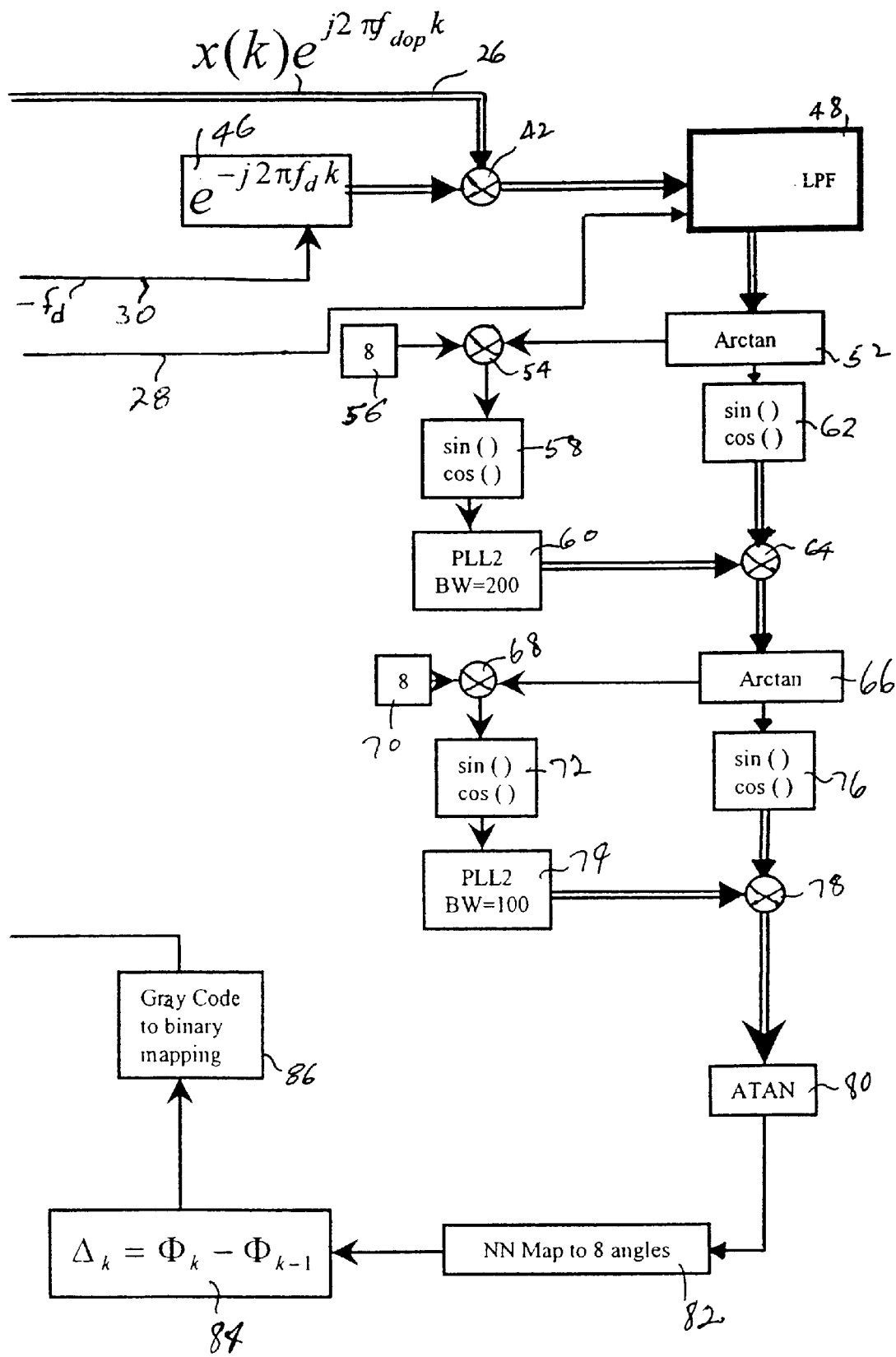
FIG. 3 is a block diagram of a symbol demodulation circuit suitable for demodulating a received radio frequency signal in accordance with a preferred embodiment of the present invention.

FIG. 3 is a block diagram of circuitry suitable for symbol demodulator 32 to perform the symbol demodulation of step S4 in accordance with a preferred embodiment of the present invention. The in-phase and quadrature components of the received radio frequency signal, sampled at, for example, 105 ksps, are applied on lines 26 to an input of multiplication circuit 42. As described above, because of the aircraft motion relative to the ground, the received signal will be at a frequency $f_{dop}$, rather than at 0 Hz. A complex exponential at the negative of the estimated Doppler frequency $f_d$, found in step S3, is applied on line 28 to signal generator 46. Signal generator 46 provides the in-phase and quadrature components of a sinusoidal signal at frequency $-f_d$ to the second input of multiplier 42. The output of multiplier 42 is thus a signal having a frequency $|f_{dop}-f_d|$ and sampled at 105 ksps. This frequency differs from zero frequency only by the error $f_e$ in the estimated Doppler frequency. This output thus has only a comparatively small residual Doppler error, for example an error of less than 50 Hz, while $f_{dop}$ could be as large as +1.6 kHz. This signal is applied to low pass filter 48 to minimize jitter or noise in the system output. By way of example, low pass filter 48 might be a 6.9 kHz finite impulse response filter with 26 taps. Filter 48 outputs every tenth sample of the 105 ksps signal applied to it, thus providing in-phase and quadrature components sampled at 10.5 ksps. The symbol tracking select value found in step S2 is applied by line 30 to filter 48 to select the output set from the filter, allowing sampling at the time at which the phase values need to be measured. That is, the signal on line 30 controls whether filter 48 selects as outputs inputs numbers 1, 11, 21, . . . , inputs numbers 2, 12, 22, . . . , inputs numbers 3, 13, 23, . . . , inputs numbers 4, 14, 24, . . . , etc.

The 10.5 ksps in-phase and quadrature outputs from filter 48 are applied to signal generator 52 which generates the arctangent of these input signals. Thus, the output from signal generator 52 is the angle represented by the in-phase and quadrature component inputs to signal generator 52. This output is applied to one input of multiplication circuit 54, which receives the constant 8 from a source 56 at its second input. This multiplication by 8 normalizes the input, stripping off the 8 phase angle modulation. The output of multiplication circuit 54 is applied to signal generator 58 which generates the sine and cosine of the angle represented by the normalized input, producing the in-phase and quadrature components of the normalized angle. These in-phase and quadrature signals are applied to second order phase lock loop 60 which might have a bandwidth in the order of 200 Hz. The sine and cosine outputs of phase lock loop 60 produce corresponding in-phase and quadrature components which are applied to an input of multiplication circuit 64. The output of arctangent signal generator 52 is also applied to signal generator 62 which determines the sine and cosine of the angle represented by its input and which applies the corresponding in-phase and quadrature signals to the second input of multiplication circuit 64.

The in-phase and quadrature outputs of multiplication circuit 64 are applied to arctangent signal generator 66 which generates a signal indicative of the angle represented by those inputs signals. This signal is applied to an input of multiplication circuit 68 which receives the constant 8 from a source 70 at its second input. Multiplication circuit 68 provides its output as in input to signal generator 72 which generates the sine and cosine of that input and applies the corresponding in-phase and quadrature components to second order phase lock loop 74, which might have a bandwidth in the order of 100 Hz. The sine and cosine outputs of phase lock loop 74 produce corresponding in-phase and quadrature components which are applied to an input of multiplication circuit 78. Signal generator 66 provides its arctangent output to signal generator 76 which determines the sine and cosine of the angle represented by its input and applies the corresponding in-phase and quadrature signals to the second input of multiplication circuit 78.

Figure 4:
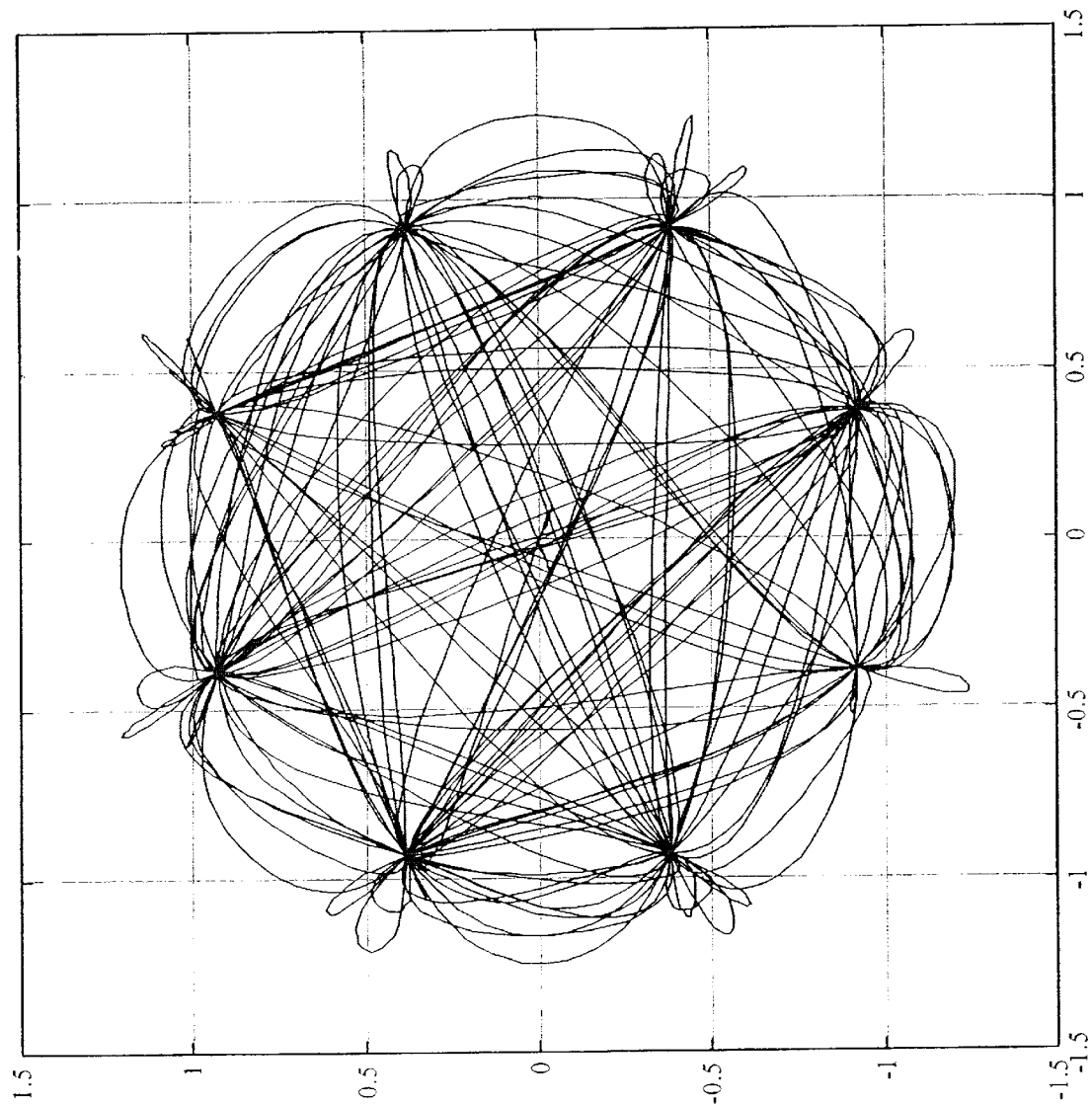
FIGS. 4 and 5 are plots of signals obtained at various points in the circuit of FIG. 3 during performance of the method of the present invention.

The tandem combination of second order phase lock loops 60 and 74 performs as a fourth order phase tracking system over the range of the error frequency $f_e$ that might exist after Doppler correction. The output of phase lock loop 74 is an 8PSK signal with fixed phase reference. The input to phase lock loop 60 contains derivatives of the input phase signal, primarily first and second derivatives. Phase lock loop 60 removes the first derivative, but leaves a remnant of the second derivative. Phase lock loop 74 removes this remnant. FIG. 4 shows the plot of the in-phase and quadrature outputs from phase lock loop 74.

Figure 5:
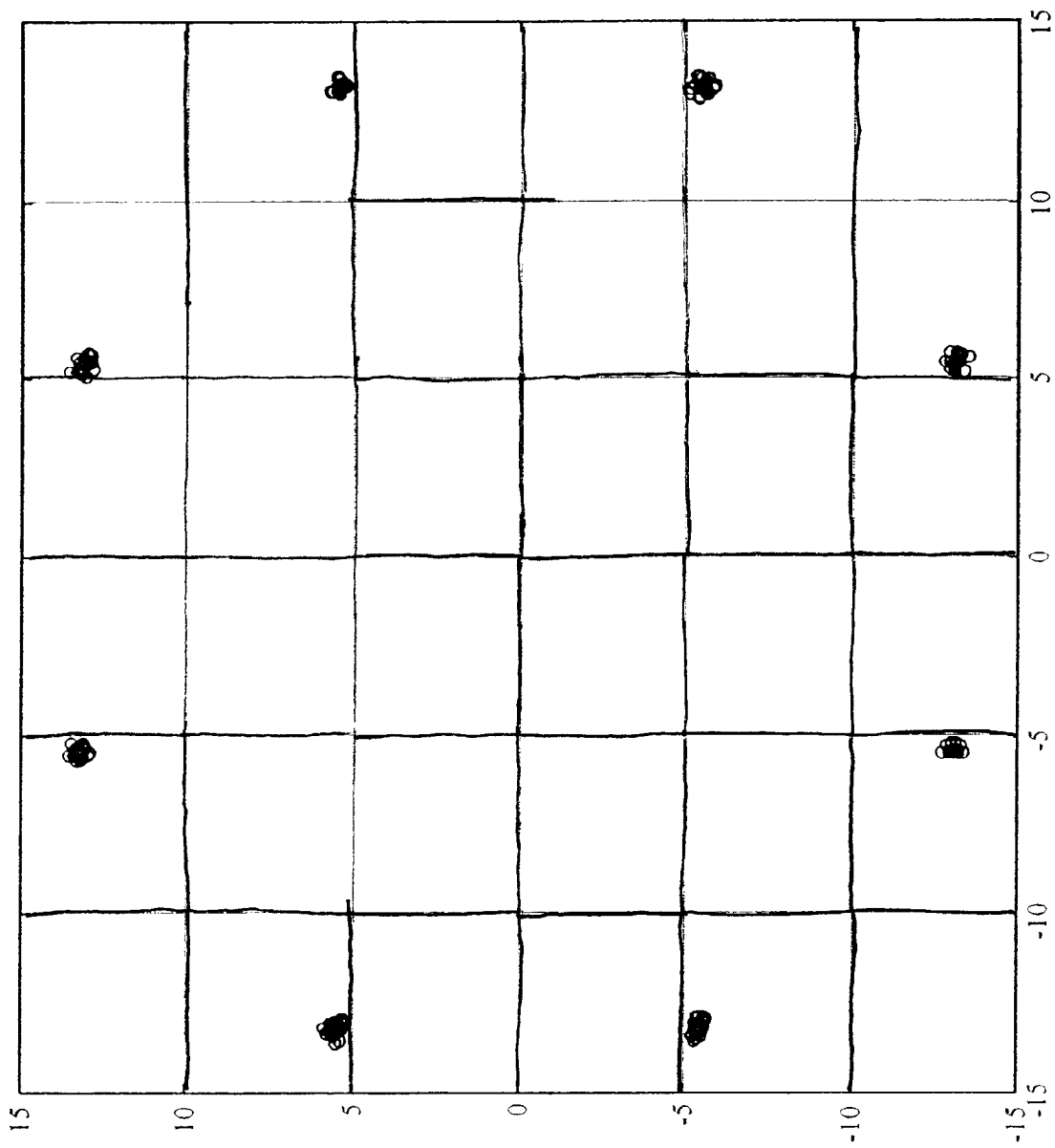

The in-phase and quadrature outputs of multiplication circuit 78 are provided to arctangent signal generator 80 which generates a signal indicative of the angle represented by those inputs. The output of signal generator 80 is applied to nearest neighbor map signal generator 82 which maps the input signal to eight angles as depicted in FIG. 5. The output of signal generator 82 is applied to difference circuit 84 which determines the difference between successive angles, to compute the differential phase. That difference signal is applied to gray code-to-binary mapping circuit 86 which maps to binary 3 bit symbols, to provide a binary output indicative of the radio frequency input signal. This binary output is then utilized in accordance with its information content in the airplane or ground station.

The present invention can be implemented in a suitably programmed data processing system, for example utilizing a Motorola Corporation 8240 central processing unit. Each of signal generators 52, 56, 58, 60, 62, 66, 70, 72, 74 and 80 could be a look-up table.

Although the present invention has been described with reference to preferred embodiments, various alterations, rearrangements, and substitutions could be made, and still the result would be within the scope of the invention.

What is claimed is:

1. A method of demodulating a received radio frequency signal, including a baseband signal with D*PSK encoded data, where * is an integer and where the baseband signal has a frequency of 0 Hz, to obtain the encoded data, said method comprising:

detecting the radio frequency signal;

reducing any Doppler error in the detected signal;

filtering the reduced signal to minimize jitter;

tracking the residual Doppler error of the baseband signal to obtain output symbols;

mapping the output symbols in a nearest neighbor map into one of * possible states;

computing the differential phase angle between successive mapped symbols; and converting the computed differential phase angles into a binary format.

2. A method as claimed in claim 1, wherein the Doppler error is reduced by estimating the Doppler error, and multiplying the detected signal by a complex exponential at the negative of the frequency of the estimated Doppler error.

3. A method as claimed in claim 2, wherein the Doppler error is estimated by filtering a portion of the detected signal at each of a plurality of filtering frequencies, determining the filtering frequency with the largest output as the frequency of the detected signal, and determining the Doppler error as the difference between the frequency of the detected signal and the known frequency.

4. A method as claimed in claim 1, further comprising converting in-phase and quadrature components of the reduced signal into angular representations, and converting the angular representations into normalized in-phase and quadrature components.

5. A method as claimed in claim 4, wherein the phase of the D*PSK encoded data is tracked in a $4^{th}$ order phase lock loop.

6. A method as claimed in claim 5, wherein the $4^{th}$ order phase lock loop comprises two $2^{nd}$ order phase lock loops in tandem.

7. A method as claimed in claim 5, wherein the phase of the D*PSK encoded data is tracked by multiplying the angular representations by * to strip off the * phase modulation, converting the stripped angular representations into stripped in-phase and quadrature components, applying the stripped in-phase and quadrature components to the phase lock loop, and multiplying the phase lock loop output by the normalized in-phase and quadrature components.

8. A method as claimed in claim 1, wherein the phase of the D*PSK encoded data is tracked in a $4^{th}$ order phase lock loop.

9. A method as claimed in claim 8, wherein the $4^{th}$ order phase lock loop comprises two $2^{nd}$ order phase lock loops in tandem.

10. A method as claimed in claim 8, wherein the phase of the D*PSK encoded data is tracked by multiplying the angular representations of the reduced signal by * to strip off the * phase modulation, converting the stripped angular representations into stripped in-phase and quadrature components, applying the stripped in-phase and quadrature components to the phase lock loop, and multiplying the phase lock loop output by the in-phase and quadrature components.

11. A method as claimed in claim 1, wherein *=8.

12. A system for demodulating a received radio frequency signal, including a baseband signal with D*PSK encoded data, where * is an integer and where the received signal is expected to be at a known frequency, to obtain the encoded data, said system comprising:

a Doppler estimator for estimating the Doppler error in the received signal;

a first multiplier for multiplying the received signal by a signal having a frequency equal to the estimated Doppler error, to reduce the Doppler error in the received signal;

a filter circuit for filtering the reduced signal to minimize jitter;

a phase lock loop circuit for tracking the residual Doppler error in the baseband signal to obtain output symbols;

a nearest neighbor map signal generator for mapping the output symbols into one of * possible states;

a difference circuit for computing the differential phase angle between successive mapped symbols; and a converter for converting the computed differential phase angles into a binary format.

13. A system as claimed in claim 12, wherein said Doppler estimator comprises a plurality of filters of different frequencies, an amplitude detector for detecting the frequency of the filter having the greatest output amplitude, and a difference circuit for determining the difference between the known frequency and the detected frequency.

14. A system as claimed in claim 12, further comprising a normalizing circuit, said normalizing circuit being responsive to in-phase and quadrature components of the reduced signal, said normalizing circuit including a first converting circuit for converting the in-phase and quadrature components into angular representations, and a second converting circuit for converting the angular representations into normalized in-phase and quadrature components.

15. A system as claimed in claim 12, wherein said phase lock loop circuit comprises a $4^{th}$ order phase lock loop.

16. A system as claimed in claim 15, wherein said phase lock loop circuit comprises two $2^{nd}$ order phase lock loops in tandem.

17. A system as claimed in claim 12, wherein *=8.

* * * * *